(12) United States Patent
Zivkovic et al.

(10) Patent No.: US 10,539,658 B2
(45) Date of Patent: Jan. 21, 2020

(54) RADAR SYSTEM

(71) Applicant: NXP B.V.

(72) Inventors: Zoran Zivkovic, Eindhoven (NL); Antonius Johannes Matheus De Graauw, Haelen (NL)

(73) Assignee: NXP B.V. (NL)

( * ) Notice: Subject to any disclaimer, the term of this patent is extended or adjusted under 35 U.S.C. 154(b) by 424 days.

(21) Appl. No.: 15/437,585

(22) Filed: Feb. 21, 2017

(65) Prior Publication Data

US 2017/0248686 A1 Aug. 31, 2017

(30) Foreign Application Priority Data

Feb. 29, 2016 (EP) .................................... 16157891

(51) Int. Cl.
*G01S 7/35* (2006.01)
*G01S 13/93* (2006.01)

(52) U.S. Cl.
CPC ............ *G01S 7/352* (2013.01); *G01S 13/931* (2013.01)

(58) Field of Classification Search
CPC ...... G01S 13/931; G01S 7/352; G01S 13/343; G01S 13/42; G01S 7/295
USPC ......................................................... 342/70
See application file for complete search history.

(56) References Cited

U.S. PATENT DOCUMENTS

| | | | |
|---|---|---|---|
| 5,140,307 A | 8/1992 | Rebetez et al. | |
| 7,151,478 B1 | 12/2006 | Adams et al. | |
| 9,541,638 B2 | 1/2017 | Jansen et al. | |
| 2004/0204113 A1 | 10/2004 | Kisigami et al. | |
| 2007/0152871 A1 | 7/2007 | Puglia | |
| 2009/0222226 A1 | 9/2009 | Baraniuk et al. | |
| 2010/0091688 A1* | 4/2010 | Staszewski | H03D 7/1441 370/277 |
| 2012/0146844 A1 | 6/2012 | Stirling-Gallacher | |

(Continued)

FOREIGN PATENT DOCUMENTS

| | | |
|---|---|---|
| NL | 1011782 C1 | 10/2000 |
| WO | 2012/056357 A1 | 5/2012 |

OTHER PUBLICATIONS

Office action for related U.S. Appl. No. 15/439,003 (dated Feb. 14, 2019).

(Continued)

*Primary Examiner* — Timothy X Pham
(74) *Attorney, Agent, or Firm* — Rajeev Madnawat

(57) ABSTRACT

A method of radar detection and a radar system for a motor vehicle are described. The radar system includes a transmitter for transmitting a radar signal having a time period, a plurality of receivers for receiving the transmitted radar signal reflected by an object, a signal compressor having a plurality inputs coupled to each of the receivers and at least one signal compressor output, the signal compressor being configured to compress the received signals to fewer output signals, each output signal having a number of samples. A signal re-constructor having at least one input coupled to each the signal compressor output and configured to determine a plurality signal strength values from the compressed signals, each signal strength value corresponding to a signal strength for a respective time-of-flight and angle-of-arrival value pair of a received signal. The radar system may detect an object with less memory and a lower power consumption while maintaining angular resolution.

15 Claims, 6 Drawing Sheets

(56) References Cited

U.S. PATENT DOCUMENTS

| | | |
|---|---|---|
| 2013/0093613 A1* | 4/2013 | Itoh ..................... G01S 13/345 |
| | | 342/70 |
| 2013/0169471 A1 | 7/2013 | Lynch |
| 2014/0240163 A1 | 8/2014 | Boufounos |
| 2014/0247181 A1 | 9/2014 | Nogueira-Nine |
| 2014/0355385 A1 | 12/2014 | Inagaki et al. |
| 2015/0042503 A1 | 2/2015 | Morelande et al. |
| 2015/0055688 A1 | 2/2015 | Xiong |
| 2015/0061922 A1 | 3/2015 | Kishigami |
| 2015/0323660 A1 | 11/2015 | Hampikian |
| 2016/0003939 A1 | 1/2016 | Stainvas et al. |
| 2016/0050055 A1 | 2/2016 | Mir Ghaderi et al. |
| 2016/0349353 A1* | 12/2016 | Wang ..................... G01S 5/14 |
| 2017/0248692 A1 | 8/2017 | Zivkovic |

OTHER PUBLICATIONS

Suetlein, J. et al. "Switching scheme for a FMCW-MIMO radar on a moving platform", 9th European Radar Conference, pp. 91-94 (2012).

Feger, R. et al. "A frequency-division MIMO FMCW radar system using delta-sigma-based transmitters", IEEE International Microwave Symposium, pp. 1-4 (2014).

Notice of Allowance for U.S. Appl. No. 15/439,003, 8 pgs (dated Jun. 17, 2019).

\* cited by examiner

RADAR SYSTEM

CROSS-REFERENCE TO RELATED APPLICATIONS

This application claims the priority under 35 U.S.C. § 119 of European Patent application no. 16157891.9, filed on Feb. 29, 2016, the contents of which are incorporated by reference herein.

FIELD

This disclosure relates to a radar system for a vehicle.

BACKGROUND

Radar systems are often used as part of adaptive driving assistance systems for motor vehicles such as cars, trucks and vans. The radar systems typically have excellent range resolution and can also measure velocity. However, angular resolution is typically poor compared to other sensors such as cameras. The angular resolution may be increased using a more complex system including phased array antennas with multiple RF receivers with a corresponding increase in power and processing.

SUMMARY

Various aspects are defined in the accompanying claims. In a first aspect there is defined a radar system for a motor vehicle comprising a transmitter for transmitting a radar signal having a time period T, a plurality of M receivers for receiving the transmitted radar signal reflected by an object, a signal compressor having M inputs coupled to each of the M receivers and at least one signal compressor output, the signal compressor being configured to compress M received signals to K output signals, each output signal having N samples and wherein K is less than M and a signal re-constructor having at least one input coupled to a respective at least one signal compressor output and configured to determine at least N*M signal strength values from the K compressed signals, each signal strength value corresponding to a signal strength for a respective time-of-flight and angle-of-arrival value pair of a received signal.

In embodiments the signal re-constructor may be configured to determine the at least N*M signal strength values by determining that most of the signal strength values are zero.

In embodiments the signal re-constructor may be further configured to determine the signal strength values by determining a difference between an expected signal value of the reflected signal and the compressed signals.

In embodiments the signal re-constructor may be further configured to determine a maximum possible expected signal value and comparing the maximum possible expected signal value with the value of the compressed signals.

In embodiments the signal compressor may comprise a switch module, the switch module comprising M switches, each switch having an input coupled to a respective receivers, an output, and a control input, and a summing module having M inputs coupled to each of the respective switch outputs and K outputs, and wherein the signal compressor is configured to modulate each of the M inputs by selectively controlling each of the switches.

In embodiments the signal compressor may be configured to modulate the M inputs with orthogonal codes at a frequency of N/T.

In embodiments the signal compressor may further comprise K analog to digital convertors configured to sample K received signals at a frequency of N/T.

In embodiments the signal re-constructor may be configured to determine the signal strength values for a matrix wherein each element of the matrix corresponds to a respective time-of-flight and angle-of-arrival value pair of a received signal.

Embodiments of the radar system may be incorporated into an advanced driver assistance system.

In a second aspect there is described a method of determining the coordinates of an object in a radar system comprising a transmitter and M receivers, the method comprising transmitting a signal for a time period T, receiving M reflected signals, compressing the M received signals into K compressed signals, each compressed signal having N samples, determining at least N*M signal strength values from the K compressed signals, each signal strength value corresponding to a signal strength for a respective combination of time-of-flight and angle-of-arrival of a received signal, and wherein the number of compressed signals K is less than the number of receivers M.

In embodiments determining the at least N*M signal strength values may further comprise determining that most of the signal strength values are zero.

In embodiments determining the signal strength values for each matrix element may comprise determining a difference between an expected signal value of the reflected signal and the compressed signals.

In embodiments compressing the received signals may comprise modulating each of the M received signals and combining the modulated signals.

In embodiments compressing the received signals may comprise modulating the M received signals with an orthogonal code.

In embodiments each of the K compressed signals may be sampled with a sample frequency of N/T.

In a third aspect there is described a computer program product comprising instructions which, when being executed by a processing unit, cause said processing unit to perform a method of determining the coordinates of an object in a radar system comprising a transmitter and M receivers, the method comprising transmitting a signal for a time period T, receiving M reflected signals, compressing the M received signals into K compressed signals, each compressed signal having N samples, determining at least N*M signal strength values from the K compressed signals, each signal strength value corresponding to a signal strength for a respective combination of time-of-flight and angle-of-arrival of a received signal, and wherein the number of compressed signals K is less than the number of receivers M.

In the figures and description like reference numerals refer to like features. Embodiments of the invention are now described in detail, by way of example only, illustrated by the accompanying drawings in which:

FIG. 1 describes a radar system for a motor vehicle according to an embodiment.

FIGS. 2A-2C illustrate a) an example chirp signal characteristic b) a periodic chirp signal characteristic and c) a radar system with respect to an object to be detected and a matrix of range and angle of arrival.

FIG. 3 describes a receiver for a radar system according to an embodiment.

DESCRIPTION

Figure 1:
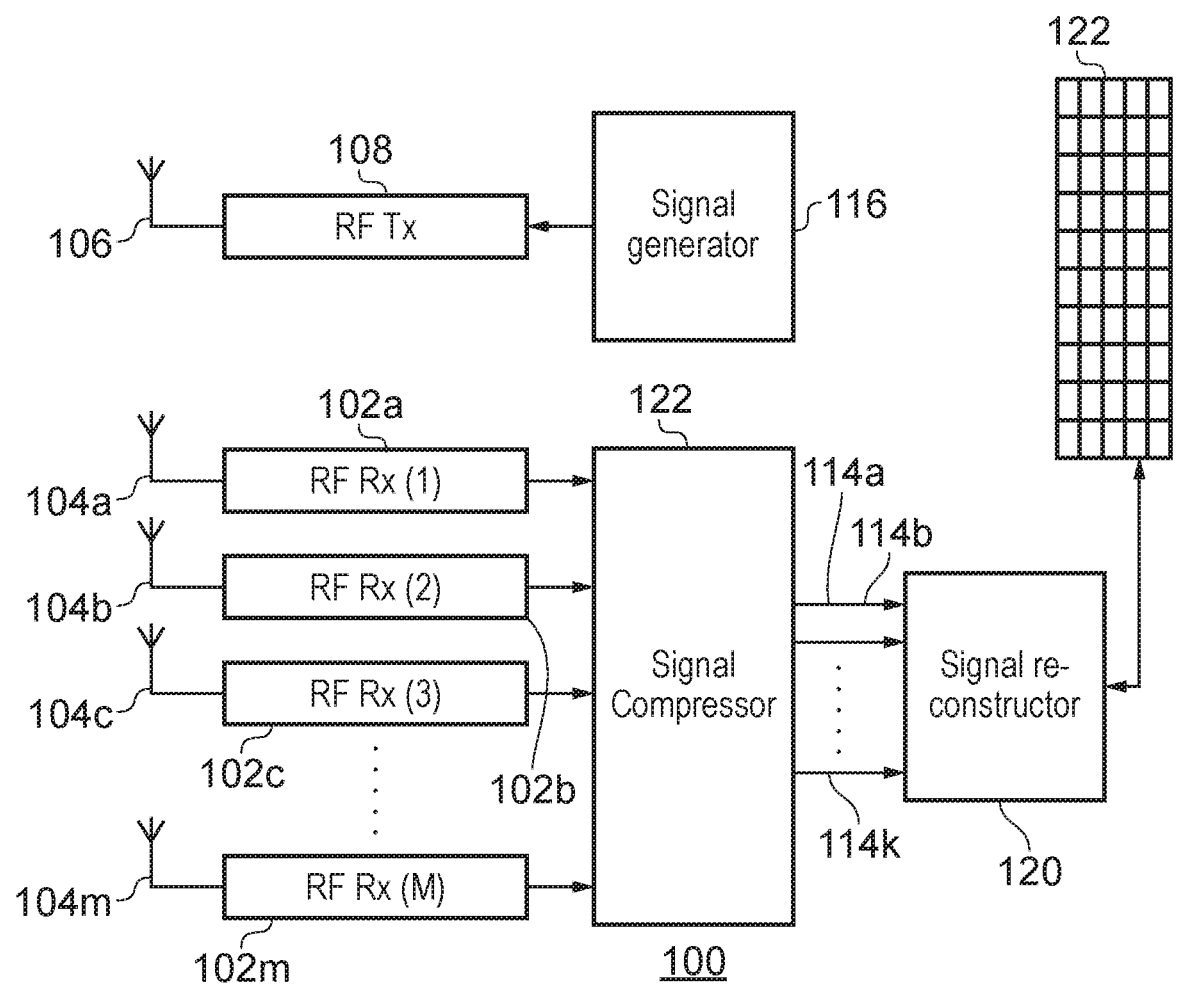

FIG. 1 describes a radar system 100 according to an embodiment. Radar system 100 has a signal generator 116 having an output connected to a radio frequency (RF) transmitter 108. The output of the RF transmitter 108 is connected to an antenna 106. The radar system 100 includes a number M of radio frequency (RF) receivers or receiver chains 102a, 102b, 102c, 102m connected to corresponding antenna 104a, 104b, 104c, 104m. The output of each of the RF receiver chains 102a, 102b, 102c, 102m are connected to a signal compressor or signal combiner 112. The signal compressor 112 has K outputs where K is less than the number of inputs M. The signal compressor 112 may have a single output i.e. K=1. Each of the output 114a, 114b . . . 104k. of the signal compressor 112 is connected to a signal re-constructor 116. An output of the signal re-constructor 120 may be connected to a memory 122. In some examples the signal re-constructor 120 may include a buffer memory connected to the output of each of the RF receiver chains 104a, 104b, 104c, 104m.

Figure 2A:
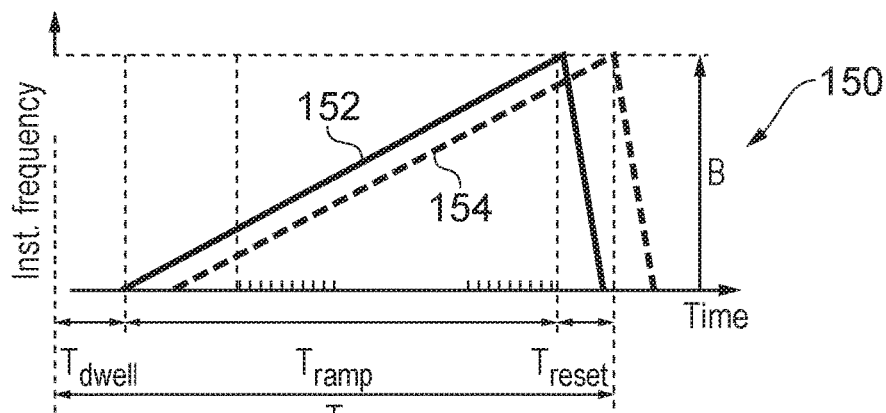
Figure 2B:
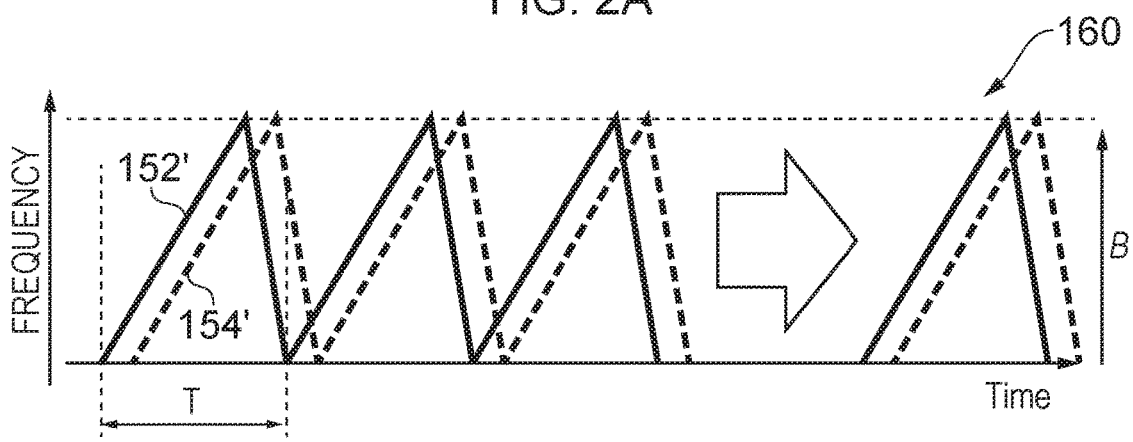

The operation of the radar 100 is now described with reference to FIG. 1 and FIGS. 2A-2C. In operation, the signal generator 114 generates a signal waveform to be transmitted by the RF transmitter 108. In a radar system such as a Frequency-Modulated Continuous-Wave (FMCW) radar, the signal generated is typically a linear frequency sweep referred to as an example of a chirp signal. The characteristics of the chirp signal are shown in FIG. 2A which shows a graph 150 of a chirp signal frequency variation on the y-axis with respect to time on the x-axis illustrated by line 152. The chirp signal may have a total time period T which may consist of an initial time period denoted $T_{dwell}$ corresponding to a period before the frequency ramp starts, a period $T_{ramp}$ corresponding to the linearly increasing frequency ramp of the chirp signal and a time period $T_{reset}$ during which the frequency is reset to the minimum frequency value. The frequency range of the ramp corresponds to the bandwidth B of the chirp signal. A time delayed version of the chirp signal illustrated by line 154 may be received by the RF receivers 104a, 104b, 104c, 104m when reflected from an object. The chirp signal may repeat with time period T as illustrated in FIG. 2B by graph 160 for transmitted chirp signal 152' and received chirp signal 154'.

Figure 2C:
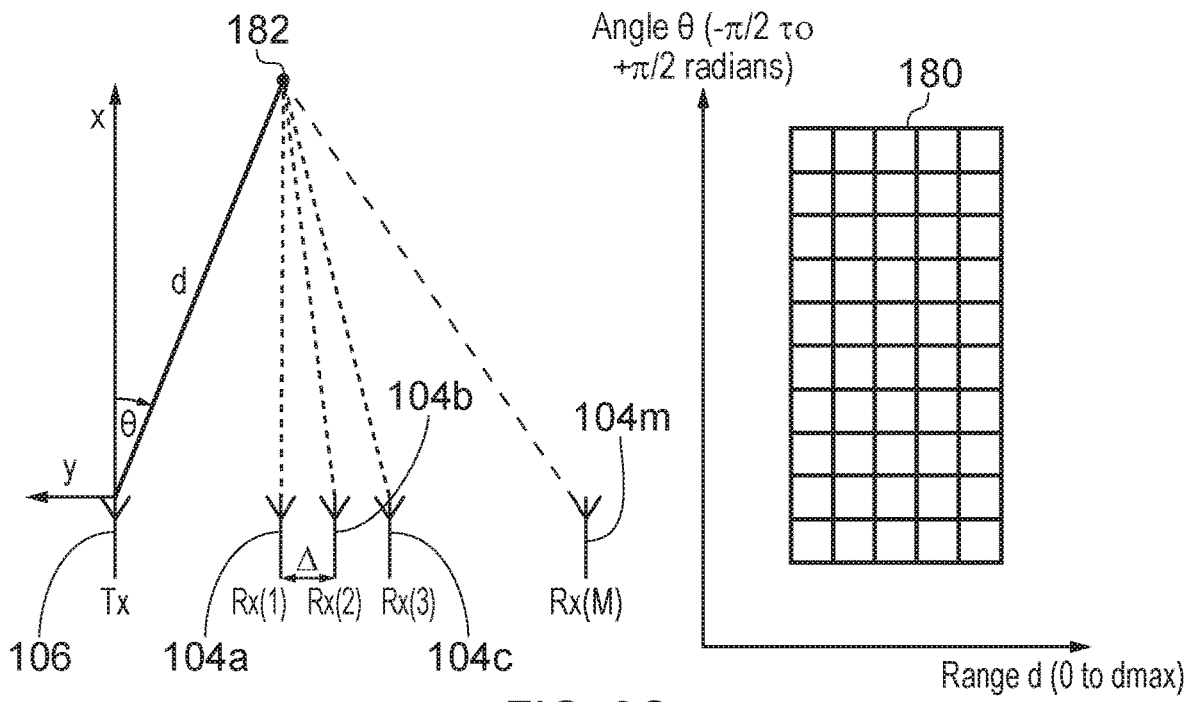

The general operation of a radar signal model is shown in FIG. 2C. Let an object be at distance d and at angle θ with respect to the radar system as shown in FIG. 2C the radar signal travels at speed of light c and when reflected from the object, it is received with a delay of 2 d/c. There will be a slight variation in delays between the signals received by the different antennas due to the different physical locations of the antennas. These additional delays will depend on the angle from which the signal is arriving θ and can be used to extract the information about the angular position of the object 182. As will be appreciated more than one object may be detected. The elements of matrix 180 may have elements corresponding to the different possible values of angle of arrival θ shown on the y axis of the matrix 180 which may typically vary between $-\pi/2$ to $+\pi/2$ radians. The x axis of the matrix corresponds to the range d which may be determined from the phase difference between the transmitted signal and received signal. The distance d may vary between 0 and a maximum value $d_{max}$ dependent on the power of the respective transmitters. A radar system for a motor vehicle such as a car, truck or van may have a maximum value $d_{max}$ of 100 metres.

Returning now to FIG. 1, the signal compressor 112 may compress or combine the signals received via the receivers 102a, 102b, 102c, 102m during the time period T of the chirp signal. For example the signal compressor 112 may switch or route varying combinations of the received signals to the K outputs during a sample time period. The combinations of signals routed typically change between successive sample periods. The combinations of signals may be determined by an orthogonal code or other code which may be used in spread spectrum communications signalling. The reflected received signal may be processed by the signal re-constructor 116 by comparing the measured incoming samples with a model of the expected response for varying values of range and angles of incidence represented by the two dimensional matrix 118. The matrix may be stored in the memory 122. The inventors of the present disclosure have realized that the angular resolution may be determined in a single chirp time period T by receiving the signal using combinations of antennas and then reconstructing the signal assuming that most of the elements of the two dimensional matrix stored in memory 122 will be zero. This may allow the location of an object with the same angular resolution as a conventional multiple receiver system but with less memory and processing logic, since the received signal reflected by one or more objects is effectively compressed from M received signals to K received signals.

In case of FMCW radar the transmitted signal is typically a linear chirp of bandwidth B that consists of a frequency changing F during period $T_{ramp}$ as explained previously with reference to FIG. 2B. It will be appreciated that the signal received by the m-th antenna can be approximated by:

$$x_{mn}^{pointmodel}(a,d,\theta,t) = ae^{j\omega(d)t}e^{j\tau(\theta,m)} \quad (1)$$

Where a is a complex number with magnitude describing the strength of the received reflected signal and:

$$\omega(d) = 2\pi \frac{2d}{c} \frac{B}{T_{ramp}} \quad (2)$$

is the distance dependent frequency of the demodulated signal. The delay $\tau(\theta, m)$ describes the relative delay of the m-th antenna with respect to some reference antenna m=0. For two antennas at distance Δ from each other, the delay between the 2 signals can be approximated by $$2\pi \frac{\Delta}{\lambda} \sin\theta$$

assuming that the object distance d is much larger than the distance between the antennas, usually the case in practice. For M uniformly spaced antennas $$\tau(\theta, m) = 2\pi \frac{m\Delta}{\lambda} \sin\theta$$

where $\lambda$ is the wavelength of the radar signal.

$$x_{mn}^{pointmodel}(a, d, \theta) = a e^{j2\pi \frac{2d}{c/B} \frac{n}{N}} e^{j2\pi \frac{\sin\theta}{\lambda/(M\Delta)} \frac{m}{M}} \quad (3)$$

Where $x_{mn}$ denotes the n-th complex data sample during the transmission from the m-th antenna. In non-complex receivers the sample is equal to the real part of the sample. The radar signal does not reflect from a single point but from many points in space. We can define a set of distances $d_l$ and angles $\theta_\kappa$ and approximate the received signal at antenna m as sum of reflections from all these possible points:

$$x_{mn}^{model}(A) = \Sigma_{l=0}^{N-1} \Sigma_{k=0}^{M-1} a_{kl} e^{j\omega_k m} e^{j\omega_l n} \quad (4)$$

where each $\omega_k$ corresponds to an angle $\theta_\kappa$ and each $\omega_l$ corresponds to a distance dl. The anti-alias filter is usually set according to the Nyquist sampling criteria to remove all frequencies above 1/(2T/N) Hertz. As result the maximum distance that radar can estimate can be calculated from above as: N*c/(4B). The model depends on the unknown reflected signal strengths described by elements $a_{kl}$ of the matrix A.

Where the model depends on the unknown reflected signal described by elements $a_{kl}$ of the matrix A.

Finding values of A that minimize the difference between the observed signals, $x_{mn}$ and the model predicted signals $x_{mn}^{model}(A)$ is typical radar processing for detecting objects based on the radar signals. The sum of squared distances is minimized as measure of difference: E(A)

$$E(A) = \Sigma_{n=0}^{N-1} \Sigma_{m=0}^{M-1} (x_{mn} - x_{mn}^{model}(A))^2 \quad (5)$$

And $$\hat{A} = \operatorname{argmin}(E(A)) = \operatorname{argmin}(\Sigma_{n=0}^{N-1} \Sigma_{m=0}^{M-1} (x_{mn} - x_{mn}^{model}(A))^2) \quad (6)$$

In case of a discrete set of distances and angles $$\omega_k = \frac{2\pi k}{M}, \omega_l = \frac{2\pi l}{N},$$

we have $$x_{mn}^{model}(A) = \sum_{l=0}^{N-1} \sum_{k=0}^{M-1} x_{mn} e^{j\frac{2\pi mk}{M}} e^{j\frac{2\pi nl}{N}} \quad (7)$$

There is an efficient closed form solution for this problem, also known as 2-Dimensional Discrete Fourier Transform (DFT) which may be implemented as a Fast Fourier transform:

$$\hat{a}_{kl} = \frac{1}{NM} \sum_{n=0}^{N-1} \sum_{m=0}^{M-1} x_{mn} e^{-j\frac{2\pi mk}{M}} e^{-j\frac{2\pi nl}{N}} \quad (8)$$

For the radar system 100, after combining the M received signals to K output signals, the model following combination is $$x_n^{c,model}(A) = \sum_{m=0}^{M-1} c_{mn} \sum_{l=0}^{N-1} \sum_{k=0}^{M-1} a_{kl} e^{j\frac{2\pi mk}{M}} e^{j\frac{2\pi nl}{N}} \quad (9)$$

Where the $c_{mn}$ is a set of complex numbers used to combine the M antenna signals at each sampling point n. In case of a switch, for each n, $c_{mn}$ is 1 for m corresponding to one antenna and zero for all others. The goal for minimization of the difference of the model to the data can be defined in the same way:

$$E^c(A) = \Sigma_{n=0}^{N-1} (x_n^c - x_n^{c,model}(A))^2 \quad (10)$$

And $$\hat{A} = \operatorname{argmin}(E^c(A)) = \operatorname{argmin}(\Sigma_{n=0}^{N-1} (x_n^c - x_n^{c,model}(A))^2) \quad (11)$$

For the radar system 100 there are only N measurement samples $x_n^c$ whereas there are NM unknown $a_{kl}$ values in the matrix A. The problem is under-determined and as the consequence there will be many solutions with perfect model fit $x_n^c = x_n^{c,model}(A)$. In this case a discrete Fourier transform cannot be used The inventors of the present application have realised that since most of the space is air which does not reflect the radar signals, most of the $a_{kl}$ values are expected to be zero. This can be taken into account and an alternative problem can be defined as determining from all values of A that satisfy $x_n^c = x_n^{c,model}(A)$, the value of A that has the minimal number of $a_{kl}$ different than zero. The solution will extract the relevant information from the incomplete combined data.

This problem may be solved use a sparse approximation technique, for example by adding an initial term which captures the intuition that most $a_{kl}$ are expected to be zero as an additional regularization term $$R^c(A) = \Sigma_{l=0}^{N-1} \Sigma_{k=0}^{M-1} |a_{kl}| \quad (12)$$

The minimization corresponding to the best fit between the measured results and the model is determined from $$\hat{A} = \operatorname{argmin}(E^c(A) + \lambda_R R^c(A)) \quad (13)$$

Whereby $E^c(A)$ and $R^c(A)$ are determined from equations (12) and (13), and $\lambda_R$ is typically a constant value that is selected from a characterization of the particular implementation of the radar system 100. For example the parameter $\lambda_R$ may be chosen by cross validation. Various values of $\lambda_R$ are tried for various data and the one minimizing the cross-validated error is used. A value of zero corresponds to the original non determined problem. During testing some small value, for example 0.0001 is used initially and then increased until the error on testing with cross validation data starts increasing.

The signal re-constructor 118 may implement equations 9, 10, 11, 12, 13 which may allow the determination of the location of an object within a single chirp period with a similar angular resolution to that achieved by multiple receivers with reduced memory. For example in the conventional case for M receive antennas, for N samples taken during the chirp period T, the memory required following conversion may be M×N samples. For the radar system 100, this requirement may be reduced to a memory of K×N samples. It will be appreciated that the signal re-constructor 118 may be implemented for example by software executable on a digital signal processor or other microprocessor and consequently the matrix processing described in the above equations may be implemented using software. Alternatively or in addition, some of the functions in the signal re-constructor 116 may be implemented using dedicated logic hardware.

Figure 3:
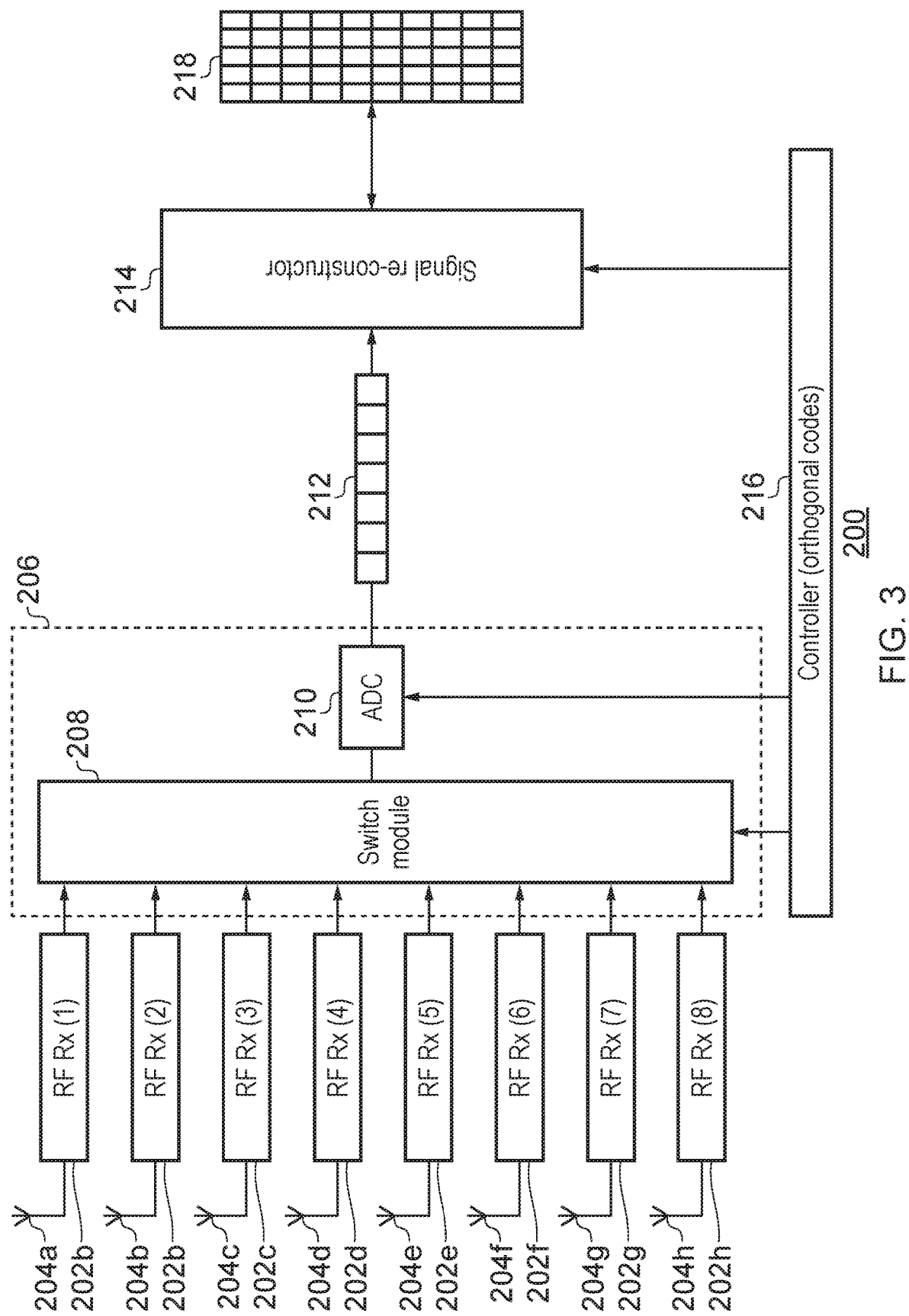

FIG. 3 shows an example of a radar system 200 having 8 receivers. Receiver antennas 204a to 204h may be connected to respective RF receiver chains 202a to 202h. The output of each receiver chain may be connected to a switch module 208. The output of the switch module 208 may be connected to an analog to digital converter 210. The switch module 208 and analog to digital converter 210 may be included in a signal compressor 206. The output of analog to digital converter 210 may be connected to a memory 212. An output of the memory 212 may be connected to a signal re-constructor 214. A controller 216 which may be implemented using logic hardware, or a combination of hardware and software may be connected to control inputs of the analog to digital converter 210, the switch module 208 and the signal re-constructor 214

In operation of the radar system 200, a radar chirp signal may be transmitted by the transmitter not shown) and a reflected signal from an object received by the receiver antennas 204a to 204h. f If N samples of the received signal are taken during a chirp period T, the controller 208 may control the switch module 208 to connect one of the receivers 202a-h to the analog-to-digital convertor 210 in a sample period T/N. Alternatively or in addition, the controller 216 may select more than one of the receivers in a sample period T/N. The signals from the selected signals may be summed in the switch module 208 before being sampled by the analog-to-digital converter 210. The output samples measured during the chirp period T may be stored in the memory 212. The signal constructor 214 may reconstruct the signal by comparing the measured samples with an expected result from a model as previously explained using equations 9 to 13 and generate a result matrix in the memory 218. The reconstructed signal output from the signal constructor 214 may then show one or more peak values indicating the location of respective objects with respect to the radar system 200.

Now considering one sequence received per antenna $c_{mn}$ (with n=1 . . . N) and denoting as vector $c_m$, then the M sequences $c_m$ should have properties typical for good sequences used in spread spectrum communication. Assuming all antennas are equally important then the sequences may have one or more of the following properties:

The frequency spectrum of each sequence $c_m$ may be wide, ideally flat. For example $c_m$ may be sampled at T/N sample time intervals and so the frequency range may have energy in many or all parts of a bandwidth corresponding to range between zero and the Nyquist frequency 1/(2T/N). If all sequences is chosen to have only part of the spectrum then reconstruction of the full spectrum will not be possible. If one of the sequences is not wide spectrum then the information from that receive antenna will not be used optimally.

The total power of the sequences should be similar, that is to say within 5% to equally use the information from all the antennas, that is to say the output should be balanced.

The cross correlation between two sequences for two different antennas should be minimal. For example, the sequences may be orthogonal with cross correlation value of zero.

Some examples of appropriate sequence generators are so-called "Gold codes" or Pseudo noise generated using shift registers. In other examples other spread spectrum code sequences may be used.

Figure 4A:
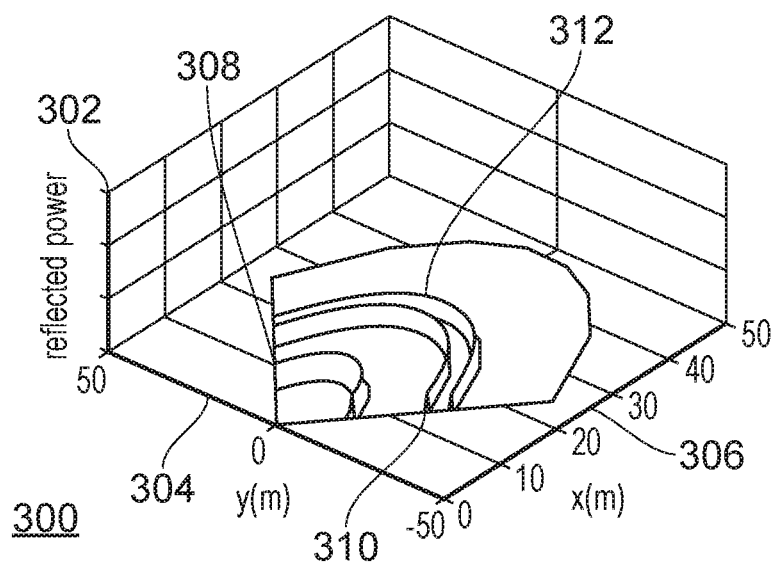
FIG. 4 shows a) object detection results for a typical radar system with a single transmitter and single receiver b) object detection results for a typical MIMO radar system and c) object detection results for a MIMO radar system according to an embodiment.
Figure 4B:
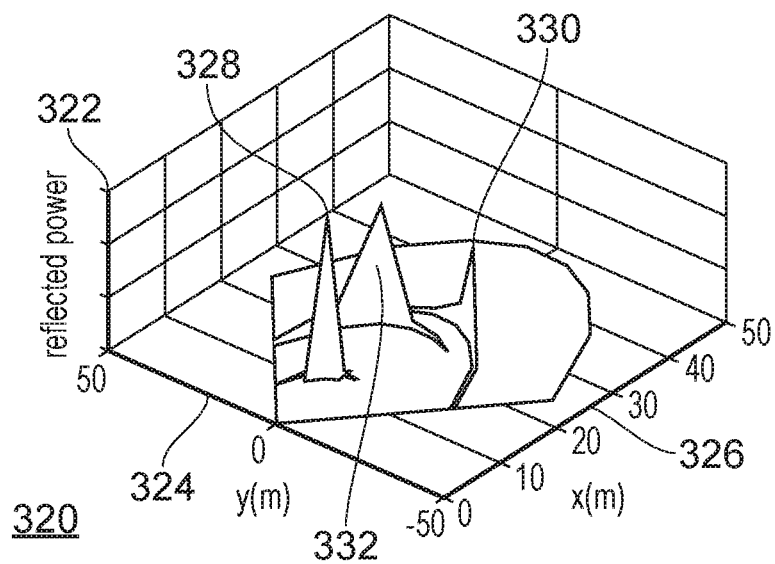
Figure 4C:
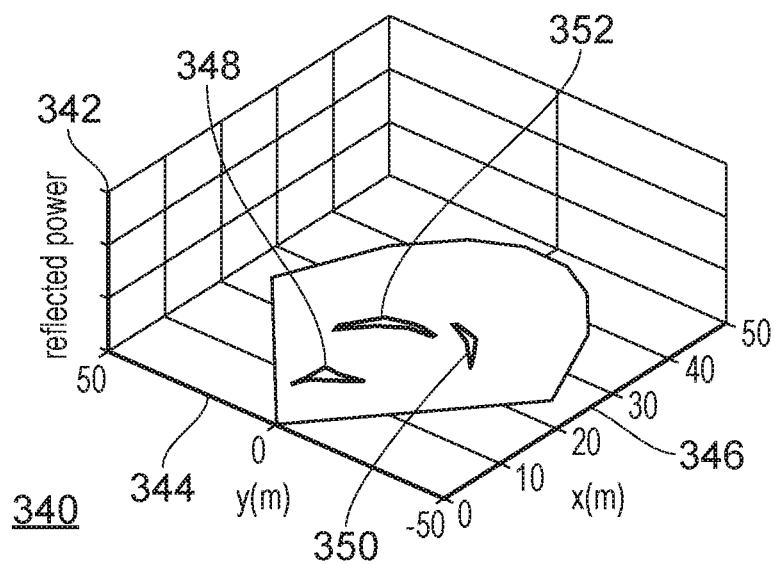

FIGS. 4A, 4B and 4C show are simulation of the reflections from objects located at the same positions for different radar systems.

FIG. 4A indicates the response 300 of a conventional radar system with 1 transmitter and 1 receiver coupled to respective antennas. The x-axis 306 varies between 0 and 50 meters. The y-axis 304 varies between −50 meters and +50 meters. The radar system in this example has M=8 receivers coupled to a respective antenna and 1 transmitter connected to a respective antenna. The angle of arrival of the reflected signals may vary in the range −pi/3 to pi/3 radians for each of the receivers. The z-axis 302 shows the total reflected power detected by the receiver. N=256 samples are taken during each chirp period T. The result of the processing using a conventional 2D Fourier transform shows that the range can be accurately determined according to arcs 308, 310, 312 but no angular resolution is possible.

FIG. 4B indicates the response 320 of a MIMO system with conventional sequential transmission of a chirp signal from 1 antenna and received by 8 receiver chains coupled to respective antennas. The x-axis 325 varies between 0 and 50 meters. The y-axis 324 varies between −50 meters and +50 meters. The radar system in this example has M=8 receivers coupled to a respective antenna and 1 transmitter connected to a respective antenna. The angle of arrival of the reflected signals may vary in the range −pi/3 to pi/3 radians for each of the receivers. The z-axis 322 shows the total reflected power detected by the receivers. N=256 samples are taken during each chirp period T. The result of the processing using a conventional 2D Fourier transform shows objects with peaks at 328, 330 and 332.

FIG. 4C illustrates a matrix (A) 340 transformed to x, y two-dimensional positions with respect to an example FMCW MIMO radar system 200 at the origin x=0, y=0. The x-axis 346 varies in meters between 0 and 50 m. The y-axis 344 varies between −50 meters and +50 meters. The reflected signals angle of arrival may vary in the range −pi/3 to pi/3 radians for each of the transmitters. The z-axis 342 shows the reflected power detected by the receiver 108. N=255 samples are taken during each chirp period T. The result of the processing by the signal re-constructor 214 shows objects with peaks at 348, 350 and 352.

It can be seen from a comparison of the peaks of graph 320 and 340 that the radar system 200 detects the object locations correctly with the same angular resolution as the conventional radar system but with lower memory and hardware requirements. The peaks are lower since fewer samples are taken corresponding to a lower peak energy. If the transmitted energy is increased the peaks will become higher.

Figure 5:
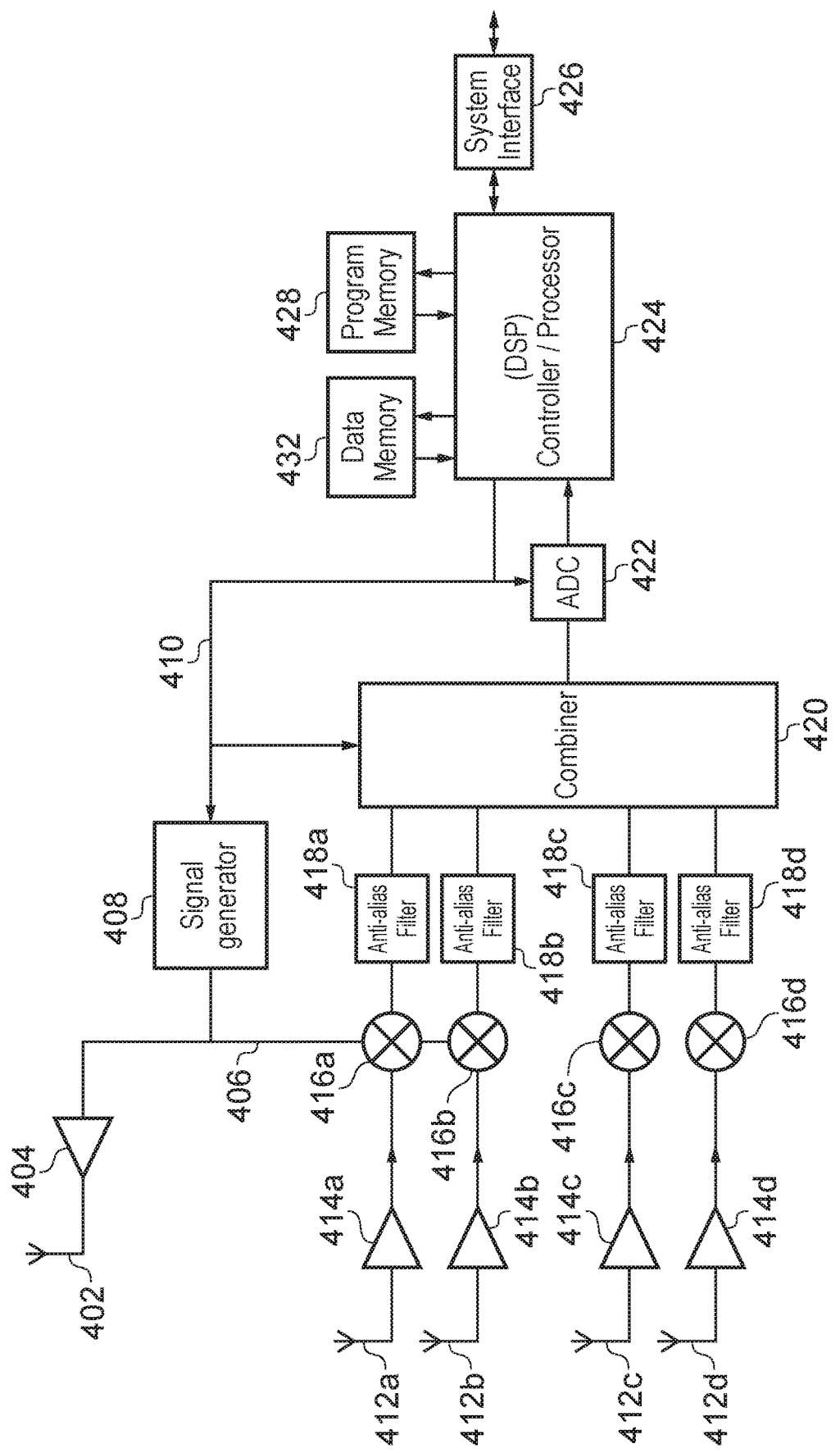
FIG. 5 illustrates a radar system according to an embodiment.

FIG. 5 shows a further example radar system 400 including a single transmitter and four receiver chains. The transmitter of the radar system 400 may include a RF amplifier 404 connected to a transmit antenna 402. Each of the receiver chains may include a series arrangement of a respective antenna 412a-d, a mixer 414a-d, and a filter 418a-d which may be an anti-alias filter. The output of each of the filters 418a-d may be connected to a combiner 420. The output of the combiner 420 may be connected to an analog-to-digital converter 422. The combiner 420 and the analog-to-digital converter 422 may be considered to be a compressor. A signal generator 408 may have a connection 406 to the input of the RF amplifier 404 and an input of each receiver mixer 418a-d.

The output of the analog-to-digital converter 422 may be connected to a controller-processor 424 which may be a digital signal processor. The controller-processor 424 may have a control output connection 410 to the signal generator 408, the signal combiner 420 and the analog to digital converter 422. The controller-processor 424 may be connected to a data memory 432 and a program memory 428. It will be appreciated that some of the data memory 432 may be used to buffer the input data from the analog-to-digital converter 422 similarly to buffer memory 212 in radar system 200. Some of the data memory 432 may be used to store the matrix 180 similarly to the memory 218 in radar system 200. It will be appreciated that the connections referred to in radar system 400 may be a physical hardware connection or a virtual software connection. The controller-processor 424 may be connected to a system interface 426. The system interface 424 may have an interface bus to communicate for example with a host processor (not shown). The program memory 428 may store a program to execute the signal reconstruction in accordance with equations 9 to 13. The program memory 426, controller-processor 424, in combination with the signal reconstruction software stored in the program memory 426 and executable by the controller-processor may be considered to implement a signal re-constructor.

In operation of the radar system 400, the processor-controller 424 may enable the signal generator 408 to generate a chirp signal on the output 406. The reflected chirp signal may be received by each of the four respective receive chains via the antennas 412a-d. Following mixing by the respective mixers 416a-d, the demodulated waveform may have a relatively low frequency, for example a frequency of approximately 40 MHz. This relatively low frequency signal typically contains the depth or distance information and the phase difference between the signal received via each of the respective receive antennas 412a-d indicates the angle of arrival of the reflected signal. The controller-processor 424 may process the signal from the receiver chain and determine a location of an object according to equations 9 to 13 as previously described. The radar system 400 may determine the location of an object with reduced memory requirements as only N samples are taken per chirp rather than 4N samples for a conventional 4-receiver MIMO radar system. Furthermore the radar system 400 has a single analog-to-digital converter 412 rather than 4 analog-to-digital converters in a typical 4-receiver system. Consequently the power consumption of the radar system 400 may be less than a conventional radar system while maintaining the same angular resolution. It will be appreciated that in other example radar systems more than one transmitter may be used.

Figure 6:
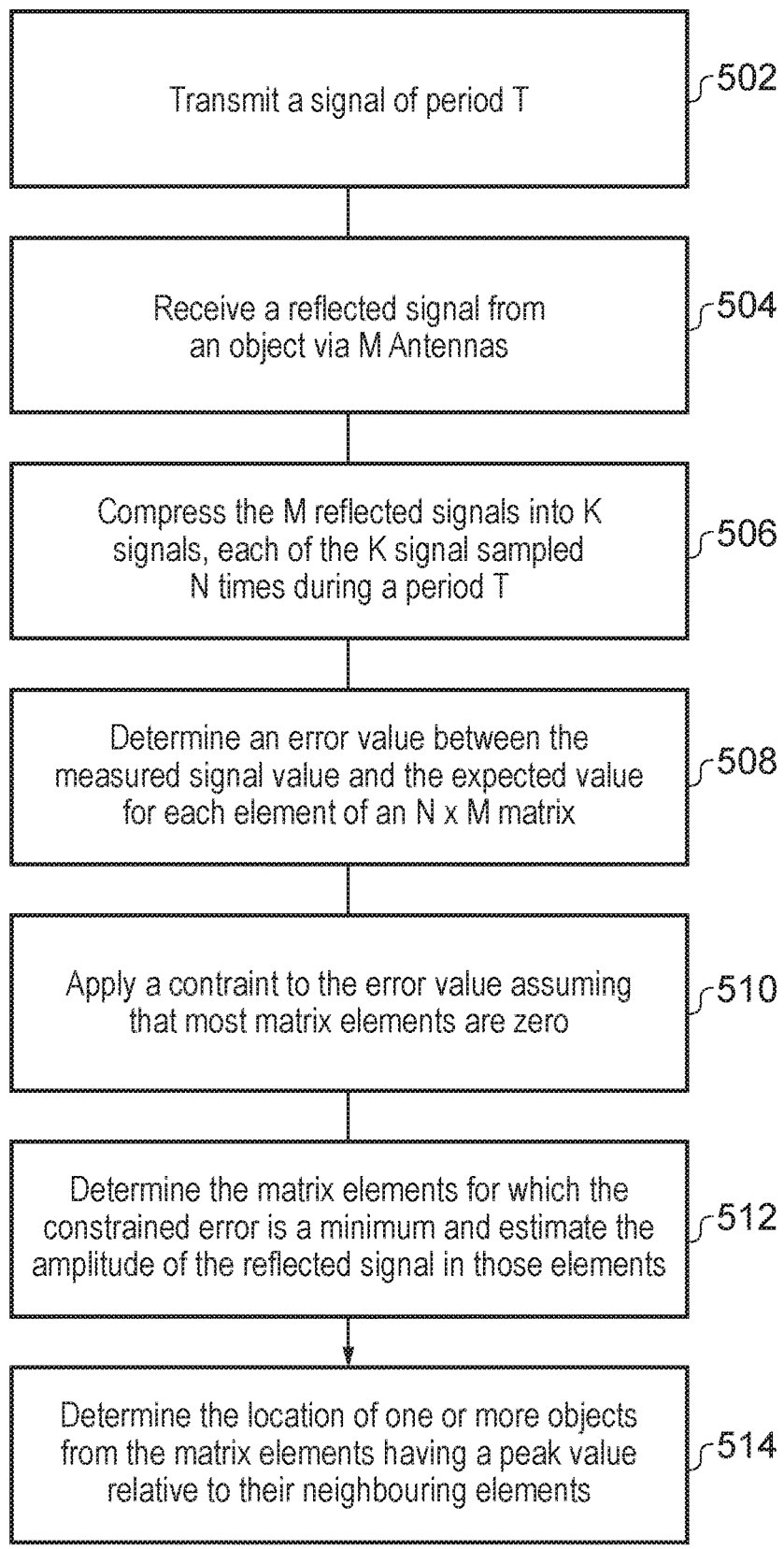
FIG. 6 shows a method of detecting an object in a radar system for a motor vehicle according to an embodiment.

FIG. 6 shows a method 500 of determining the location of an object in a radar system with multiple receivers and at least one transmitter. In step 502 a radar signal for example a chirp signal with a time period T may be transmitted.

In step 504 a reflected signal from one or more objects may be received by M antennas. In step 506 the M reflected signals may be compressed into K signals, each of the K signals are then sampled N times during the period T.

In step 508 an expected value for each value of distance and angle of arrival may be determined from a model of the reflected signal received by a receiver. The expected value which may be represented in a range-value matrix. As will be appreciated, the values of each matrix element may be stored in a memory to avoid recalculating the expected values for each element. For each of the N samples, the reflected signal may be compared with the expected values in the matrix elements and an error between the measured signal value and the expected value is determined.

In step 510 a constraint may be applied to the error term which assumes that most matrix element values are zero. This may be for example the regularization function described in equations 9 to 13.

In step 512 the matrix element for which the constrained error is a minimum may be determined and the amplitude of the reflected signal for those matrix elements may be determined.

In step 514, the location of one or more objects may be determined from one or more peak values determined from a comparison of the matrix element values with respect to their neighbouring matrix elements. This may be considered a localized peak value which indicates the location of an object. As will be appreciated the radar system may detect multiple reflections from multiple objects.

The method 500 may allow the location of an object to be determined in a system with a reduction in memory and processing requirements. The complexity of the hardware in the receiver may also be reduced since for example fewer hardware elements may be required in the receiver following signal compression.

A method of radar detection and a radar system for a motor vehicle are described. The radar system includes a transmitter for transmitting a radar signal having a time period, a plurality of receivers for receiving the transmitted radar signal reflected by an object, a signal compressor having a plurality inputs coupled to each of the receivers and at least one signal compressor output, the signal compressor being configured to compress the received signals to fewer output signals, each output signal having a number of samples. A signal re-constructor having at least one input coupled to each the signal compressor output and configured to determine a plurality signal strength values from the compressed signals, each signal strength value corresponding to a signal strength for a respective time-of-flight and angle-of-arrival value pair of a received signal. The radar system may detect an object with less memory and a lower power consumption while maintaining angular resolution.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A radar system for a motor vehicle comprising:
   a transmitter configured to transmit a radar signal having a time period T;
   a plurality of M receivers configured to receive the transmitted radar signal reflected by an object;

a signal compressor having M inputs coupled to each of the M receivers and at least one signal compressor output, the signal compressor being configured to compress M received signals to K output signals, each output signal having N samples, wherein K is less than M; and a signal re-constructor having at least one input coupled to the at least one signal compressor output and configured to determine at least N*M signal strength values from the K compressed signals, each signal strength value corresponding to a signal strength for a respective time-of-flight and angle-of-arrival value pair of a received signal.

2. The radar system of claim 1, wherein the signal re-constructor is configured to determine the at least N*M signal strength values by determining that most of the signal strength values are zero.

3. The radar system of claim 1, wherein the signal re-constructor is further configured to determine the signal strength values by determining a difference between an expected signal value of the reflected signal and the compressed signals.

4. The radar system of claim 1, wherein the signal re-constructor is further configured to determine a maximum possible expected signal value and compare the maximum possible expected signal value with the value of the compressed signals.

5. The radar system of claim 1, wherein the signal compressor further comprises:
a switch module, the switch module comprising M switches, each switch having an input coupled to a respective receivers, an output, and a control input; and
a summing module having M inputs coupled to each of the respective switch outputs and K outputs, wherein the signal compressor is configured to modulate each of the M inputs by selectively controlling each of the switches.

6. The radar system of claim 5, wherein the signal compressor is configured to modulate the M inputs with orthogonal codes at a frequency of N/T.

7. The radar system of claim 1, wherein the signal compressor further comprises:
K analog to digital converters configured to sample K received signals at a frequency of N/T.

8. The radar system of claim 1, wherein the signal re-constructor is configured to determine the signal strength values for a matrix wherein each element of the matrix corresponds to the respective time-of-flight and angle-of-arrival value pair of the received signal.

9. An advanced driver assistance system comprising the radar system of claim 1.

10. A method of determining coordinates of an object in a radar system comprising a transmitter and M receivers, the method comprising:
transmitting a signal for a time period T, receiving M reflected signals;
compressing the M received signals into K compressed signals, each compressed signal having N samples;
determining N*M signal strength values from the K compressed signals, each signal strength value corresponding to a signal strength for a respective combination of time-of-flight and angle-of-arrival of a received signal, wherein the number of compressed signals K is less than the number of receivers M.

11. The method of claim 10, wherein determining the N*M signal strength values further comprises:
determining that most of the signal strength values are zero.

12. The method of claim 10, wherein determining the signal strength values for each matrix element further comprises:
determining a difference between an expected signal value of the reflected signal and the compressed signals.

13. The method of 10, wherein compressing the received signals further comprises:
modulating each of the M received signals and combining the modulated signals.

14. The method of claim 13, wherein compressing the received signals further comprises:
modulating the M received signals with an orthogonal code.

15. The method of claim 10, further comprising:
sampling each of the K compressed signals with a sample frequency of N/T.

* * * * *